United States Patent [19]
Alexander

[11] Patent Number: 5,836,054
[45] Date of Patent: Nov. 17, 1998

[54] CYLINDRICAL CABLE TIE

[75] Inventor: Gary E. Alexander, Baton Rouge, La.

[73] Assignee: Medisys Technologies, Inc., Baton Rouge, La.

[21] Appl. No.: 727,272

[22] Filed: Oct. 8, 1996

[51] Int. Cl.[6] .................................................. B65D 63/10
[52] U.S. Cl. ........................................ 24/16 PB; 292/318
[58] Field of Search ............................. 24/16 R, 16 PB,
24/17 AP, 30.5 P; 248/74.3; 292/318, 321,
322; 70/16, 457, 458

[56] References Cited

U.S. PATENT DOCUMENTS

| | | |
|---|---|---|
| 970,529 | 9/1910 | Miller .................................. 292/318 |
| 1,001,878 | 8/1911 | Miller .................................. 292/318 |
| 1,178,758 | 4/1916 | Sondley ............................... 292/318 |
| 1,682,396 | 8/1928 | Miller .................................. 292/318 |
| 2,771,768 | 11/1956 | Tudor .................................... 70/457 |
| 2,871,691 | 2/1959 | Bacon ............................... 70/457 X |
| 3,009,220 | 2/1961 | Fein . |
| 3,570,497 | 3/1971 | Lemole . |
| 3,855,669 | 12/1974 | Meyer . |
| 3,881,334 | 5/1975 | Wilson .................................. 70/457 |
| 3,900,923 | 8/1975 | Thomas . |
| 3,991,444 | 11/1976 | Bailey . |
| 4,008,512 | 2/1977 | Prodel . |
| 4,236,280 | 12/1980 | Kreiseder . |
| 4,272,870 | 6/1981 | McCormick . |
| 4,507,828 | 4/1985 | Furutsu . |
| 4,727,630 | 3/1988 | Alan . |
| 4,794,674 | 1/1989 | Mintel et al. . |
| 4,958,414 | 9/1990 | Benoit . |
| 5,267,967 | 12/1993 | Schneider . |
| 5,293,669 | 3/1994 | Sampson . |
| 5,304,188 | 4/1994 | Marogil . |
| 5,367,749 | 11/1994 | Takeuchi . |
| 5,414,904 | 5/1995 | Sampson . |

FOREIGN PATENT DOCUMENTS

| | | | |
|---|---|---|---|
| 2491582 | 4/1982 | France .................................. 24/16 R |
| 2360992 | 7/1974 | Germany ............................ 24/16 PB |

*Primary Examiner*—James R. Brittain
*Attorney, Agent, or Firm*—Roy, Kiesel & Tucker, PL

[57] ABSTRACT

The invention entails a cable tie having an elongated body and a hollow receiving head. The receiving head is attached to the body at one end. At the other end, the receiving head contains a mouth opening. The mouth opening is sufficiently large to receive the opposite end of the body. Teeth are arranged on the exterior of the body. At least one locking arm with a lip is positioned at the mouth opening. Preferably, the arm should have two ends with a pivot point in between. The lip should be positioned on one side of the pivot point. The teeth and the lip are positioned to cooperate with one another so that the locking arm holds the body in position when the body is inserted into the receiving head. By applying pressure to the end of the arm opposite the lip, the arm may be pivoted so that the lip will disengage the teeth, allowing the body to be freely withdrawn from the receiving head. The locking arm and teeth may be constructed so that the cable tie may be tightened but not loosened when the lip and the teeth are engaged.

70 Claims, 1 Drawing Sheet

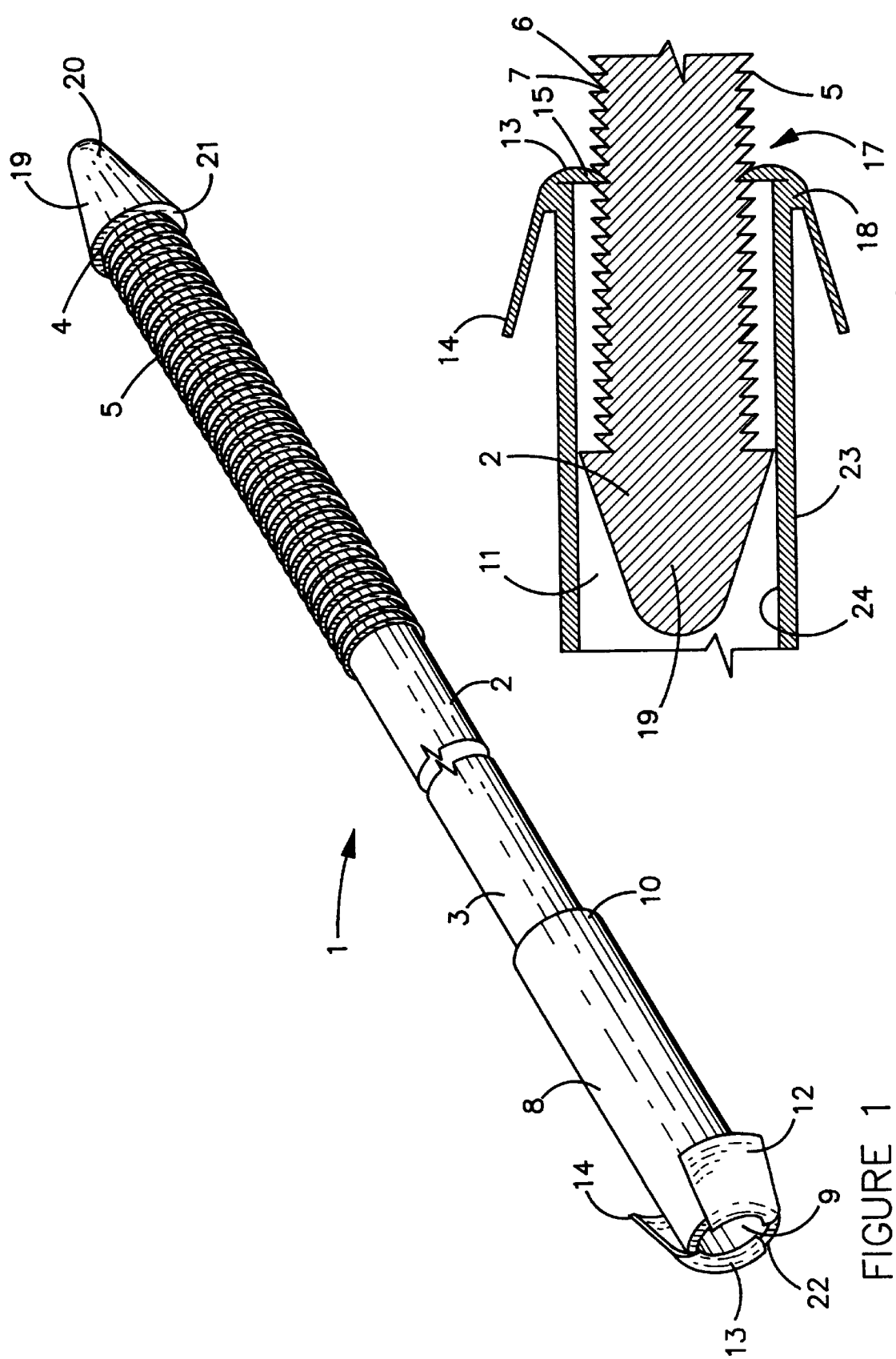

CYLINDRICAL CABLE TIE

BACKGROUND OF THE INVENTION

1. Field of the Invention:

The invention relates generally to cable ties and more particularly to circular cable ties.

2. Prior Art:

Cable ties are often used in industrial applications in the vicinity of machinery with moving parts. In such situations, loose ends of a cable tie are a hazard because they may be caught in the moving parts. This can lead to failure of the tie or failure of the machinery. Similarly, ties that will not lie flat against the bound objects are a hazard. Protrusions of the loop formed by the cable tie may likewise become entangled in moving parts.

Other situations, such as surgical or other medical uses, may require that the size of cable tie be limited. For example, a constrictor is used in some axial gripping forceps replacement applications (see e.g., allowed U.S. patent application Ser. No. 08/254,120). In such situations, loose ends or protrusions in a cable tie may be undesirable. Accordingly, a cable tie that meets the following objectives is disclosed.

OBJECTS OF THE INVENTION

It is an object of the invention to provide a cable tie that is substantially circular when closed.

It is another object of the invention to provide a cable tie that will tighten when pressure is applied to the exterior of the loop formed when the tie is closed.

It is still another object of the invention to provide a cable tie that may be tightened with one hand.

It is yet another object to provide a cable tie that has no stray end when closed.

It is a still farther object of the invention to provide a cable tie that will deliver a uniformly distributed constricting force to the object or objects which are bound by the tie.

SUMMARY OF THE INVENTION

The invention may be summarized by reference to a preferred embodiment. In this preferred embodiment, the invention entails a cylindrical cable tie. This cable tie has an elongated cylindrical body and a tubular receiving head. The receiving head is attached to the body at one end. At the other end, the receiving head contains a mouth opening. The mouth opening is sufficiently large to receive the opposite end of the body.

Teeth are arranged on the exterior of the body. At least one locking arm with a lip is positioned at the mouth opening. Preferably, the arm should have two ends with a pivot point in between. The lip should be positioned on one side of the pivot point. The teeth and the lip are positioned to cooperate with one another so that the locking arm holds the body in position when the body is inserted into the receiving head. By applying pressure to the end of the arm opposite the lip, the arm may be pivoted so that the lip will disengage the teeth, allowing the body to be freely withdrawn from the receiving head. The locking arm and teeth may be constructed so that the cable tie may be tightened but not loosened when the lip and the teeth are engaged.

BRIEF DESCRIPTION OF THE DRAWINGS

FIG. 1 is a perspective view of a preferred embodiment of the cable tie shown open.

FIG. 2 is a cross sectional view of a the receiving head and tail end portions of a preferred embodiment of the cable tie shown closed.

DETAILED DESCRIPTION OF THE INVENTION

A cable tie 1 is disclosed. Cable tie 1 comprises a flexible elongated body member 2 having a head end 3 and a tail end 4. In a preferred embodiment, body member 1 is generally cylindrical, has an external diameter of about ¼ of an inch, is made of a strong flexible material such as plastic, and is solid. In another preferred embodiment, body member 2 has a mouth end 22 and a tail end 4. In this embodiment, at least a portion of the center of body member 2 is hollow.

A plurality of teeth 5 are positioned on body member 2. In one preferred embodiment, each tooth member 5 has a high end 6 and a low end 7. Preferably, high end 6 faces head end 3 of body member 2 while low end 7 faces tail end 4. Teeth 5 are preferably made of strong resilient material such as plastic. Teeth 5 may alternatively be raised from or recessed into body member 2.

In one preferred embodiment, a receiving head 8 having a mouth end 22 and a seat end 10 is fixably attached to head end 3 of body member 2. In a preferred embodiment, receiving head 8 is tubular. A chamber wall 23 having interior surfaces 24 extends from seat end 10 to mouth end 22. Mouth end 22, seat end 10 and interior surfaces 24 of chamber wall 23 define a receiving cavity 11 within head 8. Mouth end 22 contains a mouth opening 9 which provides passage into receiving cavity 11. Mouth opening 9 and receiving cavity 11 are sized to receive tail end 4 of body member 2. Receiving head 8 is preferably made of a strong resilient material such as plastic.

In another preferred embodiment, mouth opening 9 is contained in mouth end 22 of body member 2. In this embodiment, mouth opening 9 provides passage to receiving cavity 11 of body member 2. In this embodiment, mouth opening 9 and receiving cavity 11 are sized to receive tail end 4 of body member 2. In this embodiment, body member 2 should either be larger at mouth end 22 than at tail end 4 or mouth end 22 of body member 2 should be sufficiently flexible to allow for the insertion of tail end 4 into mouth opening 9 and receiving cavity 11.

In one preferred embodiment, at least one locking arm 12 is positioned at mouth opening 9. Locking arm 12 has a lip end 13 and a control end 14. At least one lip 15 depends from lip end 13. Locking arm 12 has an open position 16 (not shown) and a closed position 17. Control end 14 may be used to move locking arm 12 from closed position 17 to open position 16. In a preferred embodiment, locking arm 12 has a pivot point 18 that is between control end 14 and lip end 13. In this embodiment, control end 14 should be depressed to move locking arm 12 from closed position 17 to open position 16. In another embodiment, control end 14 and lip end 13 may both be located on the same side of pivot point 18. In this embodiment, control end 14 should be lifted to move locking arm 12 from closed position 17 to open position 16.

In a more preferred embodiment, cable tie 1 has two locking arms 12 positioned on opposite sides of mouth opening 9. In this embodiment, pivot point 18 is located between control end 14 and lip end 13 on both locking arms 12. Thus, both locking arms 12 may be moved from closed position 17 to open position 16 by squeezing both control ends 14 together.

Other means for locking body member 2 within receiving head 8 may be used. For example, control end 14 may be omitted from locking arm 12. By appropriately beveling teeth 5 and lip 13, tail end 4 of body member 2 may be inserted through mouth opening 9 but not withdrawn. Also, locking teeth may be placed on the interior surface of receiving head 8 to engage teeth 5 located on body member 2. These locking teeth may also be beveled to allow insertion of body member 2 but not withdrawal.

In another preferred embodiment, a tapered crown 19 may be fixably attached to tail end 4 of body member 2. Crown 19 should preferably have a pointed front 20 and an enlarged base 21. Base 21 should be sized to pass freely within receiving cavity 11. However, base 21 should be sized to closely fit mouth opening 9 so that base 21 will not fit through mouth opening 9 without spreading it slightly. Pointed front 20 should spread mouth opening 9 sufficiently to allow base 21 to pass through. This will allow crown 19 to be inserted into receiving cavity 11 but not removed. In a preferred embodiment, body member 2, teeth 5, receiving head 8, locking arms 12, and crown 19 are all formed from a single unit of molded plastic.

In operation, cable tie 1 will be placed around the objects to be bound. Tail end 4 of body member 2 is inserted into mouth opening 9 of head 8 or of body member 2 to form a generally circular loop 22 (not shown). When loop 22 is closed, tail end 4 and a portion of body member 2 will be contained within receiving cavity 11 or hollow center of body member 2. Cable tie 1 may be tightened by exerting pressure on the exterior of loop 22 which will force more of body member 2 through mouth opening 9. In a preferred embodiment, teeth 5 and lip(s) 15 are angled so that cable tie 1 may be tightened with locking arms 12 in closed position 17. However, to loosen cable tie 1, locking arms 12 should be in open position 16. In a preferred embodiment, locking arms 12 are moved into open position 16 by exerting inward pressure on control ends 14 of locking arms 12. When locking arms 12 are in open position 16, body member 2 may be withdrawn partially or totally from mouth opening 9. If crown 19 is in place, it will prevent body member 2 from being completely withdrawn from mouth opening 9. In some preferred embodiments, cable tie 1 will not be openable.

Other uses and embodiments of the invention will occur to those skilled in the art, and are intended to be included within the scope and spirit of the following claims.

I claim:

1. A cable tie comprising:
    a flexible elongated body member having a head end and a tail end;
    a plurality of teeth positioned on said body member;
    a receiving head having a mouth end, a seat end fixably attached to said head end of said body member, and a chamber wall extending from said seat end to said mouth end, said chamber wall having interior surfaces, said mouth end, said seat end, and said interior surfaces of said chamber wall defining a receiving chamber, said mouth end containing a mouth opening, said mouth opening providing passage into said receiving chamber, said mouth opening and said receiving chamber sized to receive said tail end of said body member; and
    at least one locking arm having a lip end and a control end, said locking arm having a pivot point between said lip end and said control end, said locking arm positioned on said receiving head, said arm configured to engage said teeth when said body member is inserted into said receiving chamber.

2. A cable tie according to claim 1 further comprising at least two locking arms.

3. A cable tie according to claim 1 further comprising an enlarged tapered crown fixably attached to said tail end of said body member.

4. A cable tie according to claim 1 wherein said individual teeth further comprise a high end and a low end, said high end facing said head end of said body member, said low end facing said tail end of said body member.

5. A cable tie according to claim 1 further comprising a lip depending from said lip end of said locking arm, said lip configured to engage said teeth when said body member is inserted into said mouth opening.

6. A cable tie according to claim 5 wherein said body member is substantially cylindrical.

7. A cable tie according to claim 5 wherein said locking arm has an open position and a closed position, said arm configured to move from said closed position to said open position by pivoting on said pivot point.

8. A cable tie according to claim 7 wherein said body member is substantially cylindrical.

9. A cable tie according to claim 1 wherein said locking arm has an open position and a closed position, said arm configured to move from said closed position to said open position by pivoting on said pivot point.

10. A cable tie according to claim 9 wherein said body member is substantially cylindrical.

11. A cable tie according to claim 1 wherein said body member is substantially cylindrical.

12. A cable tie comprising:
    a flexible elongated body member having a mouth end and a tail end, said body member having a hollow center over at least a portion of its length, said mouth end of said body member containing a mouth opening, said mouth opening providing passage to said hollow center, said mouth opening and said hollow center sized to receive said tail end of said body member;
    a plurality of teeth positioned on said body member; and
    at least one locking arm having a lip end and a control end, said locking arm having a pivot point between said lip end and said control end, said locking arm attached to said body member, said arm configured to engage said teeth when said body member is inserted into said hollow center.

13. A cable tie according to claim 12 further comprising at least two locking arms.

14. A cable tie according to claim 12 further comprising an enlarged tapered crown fixably attached to said tail end of said body member.

15. A cable tie according to claim 12 wherein said individual teeth further comprise a high end and a low end, said high end facing said head end of said body member, said low end facing said tail end of said body member.

16. A cable tie according to claim 12 further comprising a lip depending from said lip end of said locking arm, said lip configured to engage said teeth when said body member is inserted into said mouth opening.

17. A cable tie according to claim 16 wherein said body member is substantially cylindrical.

18. A cable tie according to claim 16 wherein said locking arm has an open position and a closed position, said arm configured to move from said closed position to said open position by pivoting on said pivot point.

19. A cable tie according to claim 18 wherein said body member is substantially cylindrical.

20. A cable tie according to claim 12 wherein said locking arm has an open position and a closed position, said arm configured to move from said closed position to said open position by pivoting on said pivot point.

21. A cable tie according to claim 20 wherein said body member is substantially cylindrical.

22. A cable tie according to claim 12 wherein said body member is substantially cylindrical.

23. A cable tie comprising:
- a flexible elongated body member having a head end and a tail end;
- a plurality of teeth positioned on said body member;
- a receiving head having a mouth end, a seat end fixably attached to said head end of said body member, and a chamber wall extending from said seat end to said mouth end, said chamber wall having interior surfaces, said mouth end, said seat end, and said interior surfaces of said chamber wall defining a receiving chamber, said mouth end containing a mouth opening, said mouth opening providing passage into said receiving chamber, said mouth opening and said receiving chamber sized to receive said tail end of said body member; and
- at least one locking arm positioned on said receiving head, said arm configured to releasably engage said teeth when said body member is inserted into said receiving chamber.

24. A cable tie according to claim 23 further comprising at least two locking arms.

25. A cable tie according to claim 23 further comprising an enlarged tapered crown fixably attached to said tail end of said body member.

26. A cable tie according to claim 23 wherein said individual teeth further comprise a high end and a low end, said high end facing said head end of said body member, said low end facing said tail end of said body member.

27. A cable tie according to claim 23 wherein said locking arm further comprises a lip end and a control end.

28. A cable tie according to claim 27 further comprising a lip depending from said lip end of said locking arm, said lip configured to engage said teeth when said body member is inserted into said mouth opening.

29. A cable tie according to claim 28 wherein said body member is substantially cylindrical.

30. A cable tie according to claim 27 wherein said locking arm has a pivot point between said lip end and said control end.

31. A cable tie according to claim 30 further comprising a lip depending from said lip end of said locking arm, said lip configured to engage said teeth when said body member is inserted into said mouth opening.

32. A cable tie according to claim 31 wherein said locking arm has an open position and a closed position, said arm configured to move from said closed position to said open position by pivoting on said pivot point.

33. A cable tie according to claim 32 wherein said body member is substantially cylindrical.

34. A cable tie according to claim 30 wherein said locking arm has an open position and a closed position, said arm configured to move from said closed position to said open position by pivoting on said pivot point.

35. A cable tie according to claim 34 wherein said body member is substantially cylindrical.

36. A cable tie according to claim 23 wherein said body member is substantially cylindrical.

37. A cable tie comprising:
- a flexible elongated body member having a mouth end and a tail end, said mouth end being sufficiently flexible to conform to an object bound by said cable tie, said body member having a hollow center over at least a portion of its length, said mouth end of said body member containing a mouth opening, said mouth opening providing passage to said hollow center, said mouth opening and said hollow center sized to receive said tail end of said body member;
- a plurality of teeth positioned on said body member; and
- at least one locking arm attached to said body member, said arm configured to engage said teeth when said body member is inserted into said hollow center.

38. A cable tie according to claim 37 wherein said locking arm is further configured to releasably engage said teeth when said body member is inserted into said hollow center.

39. A cable tie according to claim 37 further comprising at least two locking arms.

40. A cable tie according to claim 37 further comprising an enlarged tapered crown fixably attached to said tail end of said body member.

41. A cable tie according to claim 37 wherein said individual teeth further comprise a high end and a low end, said high end facing said head end of said body member, said low end facing said tail end of said body member.

42. A cable tie according to claim 37 wherein said locking arm further comprises a lip end and a control end.

43. A cable tie according to claim 42 further comprising a lip depending from said lip end of said locking arm, said lip configured to engage said teeth when said body member is inserted into said mouth opening.

44. A cable tie according to claim 43 wherein said body member is substantially cylindrical.

45. A cable tie according to claim 42 wherein said locking arm has a pivot point between said lip end and said control end.

46. A cable tie according to claim 45 further comprising a lip depending from said lip end of said locking arm, said lip configured to engage said teeth when said body member is inserted into said mouth opening.

47. A cable tie according to claim 46 wherein said locking arm has an open position and a closed position, said arm configured to move from said closed position to said open position by pivoting on said pivot point.

48. A cable tie according to claim 47 wherein said body member is substantially cylindrical.

49. A cable tie according to claim 45 wherein said locking arm has an open position and a closed position, said arm configured to move from said closed position to said open position by pivoting on said pivot point.

50. A cable tie according to claim 49 wherein said body member is substantially cylindrical.

51. A cable tie according to claim 37 wherein said body member is substantially cylindrical.

52. A cable tie comprising:
- a flexible elongated body member having a mouth end and a tail end, said mouth end being sufficiently flexible to conform to an object bound by said cable tie, said body member having a hollow center over at least a portion of its length, said mouth end of said body member containing a mouth opening, said mouth opening providing passage to said hollow center, said mouth opening and said hollow center sized to receive said tail end of said body member;
- a plurality of teeth positioned on said body member; and
- a means for locking said body member in said hollow center.

53. A releasable cable tie according to claim 52 further comprising an enlarged tapered crown fixably attached to said tail end of said body member.

54. A cable tie according to claim 52 wherein said individual teeth further comprise a high end and a low end, said high end facing said head end of said body member, said low end facing said tail end of said body member.

55. A cable tie according to claim 54 wherein said body member is substantially cylindrical.

56. A cable tie according to claim 52 wherein said body member is substantially cylindrical.

57. A cable tie comprising:

a flexible elongated body member having a head end and a tail end;

a plurality of teeth positioned on said body member;

a receiving head having sufficient flexibility to conform to an object bound by said cable tie, said receiving head having a mouth end, a seat end fixably attached to said head end of said body member, and a chamber wall extending from said seat end to said mouth end, said chamber wall having interior surfaces, said mouth end, said seat end, and said interior surfaces of said chamber wall defining a receiving chamber, said mouth end containing a mouth opening, said mouth opening providing passage into said receiving chamber, said mouth opening and said receiving chamber sized to receive said tail end of said body member; and at least one locking arm positioned on said receiving head, said arm configured to engage said teeth when said body member is inserted into said receiving chamber.

58. A cable tie according to claim 57 further comprising at least two locking arms.

59. A cable tie according to claim 57 further comprising an enlarged tapered crown fixably attached to said tail end of said body member.

60. A cable tie according to claim 57 wherein said individual teeth further comprise a high end and a low end, said high end facing said head end of said body member, said low end facing said tail end of said body member.

61. A cable tie according to claim 57 wherein said locking arm further comprises a lip end and a control end.

62. A cable tie according to claim 61 further comprising a lip depending from said lip end of said locking arm, said lip configured to engage said teeth when said body member is inserted into said mouth opening.

63. A cable tie according to claim 62 wherein said body member is substantially cylindrical.

64. A cable tie according to claim 61 wherein said locking arm has a pivot point between said lip end and said control end.

65. A cable tie according to claim 64 further comprising a lip depending from said lip end of said locking arm, said lip configured to engage said teeth when said body member is inserted into said mouth opening.

66. A cable tie according to claim 65 wherein said locking arm has an open position and a closed position, said arm configured to move from said closed position to said open position by pivoting on said pivot point.

67. A cable tie according to claim 66 wherein said body member is substantially cylindrical.

68. A cable tie according to claim 64 wherein said locking arm has an open position and a closed position, said arm configured to move from said closed position to said open position by pivoting on said pivot point.

69. A cable tie according to claim 68 wherein said body member is substantially cylindrical.

70. A cable tie according to claim 57 wherein said body member is substantially cylindrical.

* * * * *